(12) United States Patent
Martinez et al.

(10) Patent No.: US 11,186,736 B2
(45) Date of Patent: Nov. 30, 2021

(54) DOUBLE NETWORK BIOINKS

(71) Applicant: Cellink AB, Gothenburg (SE)

(72) Inventors: Hector Martinez, Gothenburg (SE); Patrick Thayer, Hudson, MA (US); Erik Gatenholm, Gothenburg (SE)

(73) Assignee: CELLINK AB, Gothenburg (SE)

( * ) Notice: Subject to any disclaimer, the term of this patent is extended or adjusted under 35 U.S.C. 154(b) by 0 days.

(21) Appl. No.: 17/048,755

(22) PCT Filed: Oct. 10, 2019

(86) PCT No.: PCT/US2019/055684
§ 371 (c)(1),
(2) Date: Oct. 19, 2020

(87) PCT Pub. No.: WO2020/077118
PCT Pub. Date: Apr. 16, 2020

(65) Prior Publication Data
US 2021/0179871 A1    Jun. 17, 2021

Related U.S. Application Data

(60) Provisional application No. 62/744,034, filed on Oct. 10, 2018, provisional application No. 62/748,948, filed on Oct. 22, 2018.

(51) Int. Cl.
*C09D 11/00* (2014.01)
*C09D 11/107* (2014.01)
(Continued)

(52) U.S. Cl.
CPC ............ *C09D 11/107* (2013.01); *B33Y 70/10* (2020.01); *C09D 11/101* (2013.01)

(58) Field of Classification Search
USPC ............................................ 106/31.01, 31.13
See application file for complete search history.

(56) References Cited

U.S. PATENT DOCUMENTS 5,236,416 A    8/1993  McDaniel et al.
6,103,790 A    8/2000  Cavaille et al.
(Continued)

FOREIGN PATENT DOCUMENTS

CN    103893825 B    6/2015
CN    111618302 A    9/2020
(Continued)

OTHER PUBLICATIONS (Abushall, Hany et al.) Co-Pending Application No. PCT/US19/19664, filed Feb. 26, 2019, Specification, Claims, Figures.
(Continued)

*Primary Examiner* — James E McDonough
(74) *Attorney, Agent, or Firm* — New River Valley IP Law, PC; Michele L. Mayberry

(57) ABSTRACT

The present invention relates to a double network bioink that is customizable and tailorable in terms of mechanical characteristics, diffusivity, and biological functionality that is printable at room temperature and cytocompatible. Double network bioinks of the present invention can be utilized as a standard for comparison and evaluation of bioinks and during calibration and/or are suited for the education field as a "blank slate" bioink that can be utilized to convey different scientific concepts. Specific bioinks included comprise: one or more biocompatible or non-biocompatible thickener; one or more polyethylene glycol based crosslinkable network; one or more photoinitiator; and/or optionally, one or more additives to impart desired and/or different characteristics to the bioink. In embodiments the thickener and polyethylene glycol based crosslinkable network form a structure comprising two interpenetrating networks.

25 Claims, 4 Drawing Sheets

CROSSLINKED

(51) Int. Cl.
  *B33Y 70/10* (2020.01)
  *C09D 11/101* (2014.01)
  *C09D 1/00* (2006.01)
  *C09D 4/00* (2006.01)
  *C09D 5/00* (2006.01)
  *C09K 3/00* (2006.01)

(56) References Cited

U.S. PATENT DOCUMENTS

| | | | |
|---|---|---|---|
| 6,509,733 | B2 | 1/2003 | Blubaugh et al. |
| 6,942,830 | B2 | 9/2005 | Mülhaupt et al. |
| 7,052,263 | B2 | 5/2006 | John |
| 7,105,357 | B1 | 9/2006 | Kalkum et al. |
| 7,122,712 | B2 | 10/2006 | Lutri et al. |
| 7,195,472 | B2 | 3/2007 | John |
| 7,636,610 | B2 | 12/2009 | Schillen et al. |
| 7,783,371 | B2 | 8/2010 | John et al. |
| 7,892,474 | B2 | 2/2011 | Shkolnik et al. |
| 7,894,921 | B2 | 2/2011 | John et al. |
| RE43,955 | E | 2/2013 | Shkolnik et al. |
| 8,394,313 | B2 | 3/2013 | El-Siblani et al. |
| 8,691,974 | B2 | 4/2014 | Gatenholm et al. |
| 8,931,880 | B2 | 1/2015 | Murphy et al. |
| 9,073,261 | B2 | 7/2015 | El-Siblani et al. |
| 9,315,043 | B2 | 4/2016 | Murphy et al. |
| 9,662,821 | B2 | 5/2017 | Clineff et al. |
| 9,725,613 | B2 | 8/2017 | García et al. |
| 10,226,894 | B2 | 3/2019 | Houben et al. |
| 10,272,664 | B2 | 4/2019 | Hays et al. |
| 10,675,379 | B2 | 6/2020 | Gatenholm |
| 2005/0056713 | A1 | 3/2005 | Tisone et al. |
| 2008/0305012 | A1 | 12/2008 | Camenisch |
| 2009/0003696 | A1 | 1/2009 | Ishii et al. |
| 2009/0022791 | A1 | 1/2009 | Obae et al. |
| 2010/0175759 | A1 | 7/2010 | Ikushima |
| 2010/0200752 | A1 | 8/2010 | Lee et al. |
| 2010/0206224 | A1 | 8/2010 | Thurner et al. |
| 2011/0024699 | A1 | 2/2011 | Lin et al. |
| 2011/0151482 | A1 | 6/2011 | Emery et al. |
| 2013/0309295 | A1 | 11/2013 | Gatenholm |
| 2014/0074274 | A1 | 3/2014 | Douglas et al. |
| 2015/0013476 | A1 | 1/2015 | Telimaa et al. |
| 2015/0045928 | A1 | 2/2015 | Perez et al. |
| 2015/0050719 | A1 | 2/2015 | Bammesberger et al. |
| 2015/0102351 | A1 | 4/2015 | Kimura |
| 2015/0105891 | A1 | 4/2015 | Golway et al. |
| 2015/0246182 | A1 | 9/2015 | El-Siblani et al. |
| 2015/0375453 | A1 | 12/2015 | Yost et al. |
| 2016/0236414 | A1 | 8/2016 | Reese et al. |
| 2016/0243618 | A1 | 8/2016 | Heugel et al. |
| 2016/0288414 | A1 | 10/2016 | Ozbolat et al. |
| 2017/0031149 | A1 | 2/2017 | Levin et al. |
| 2017/0079262 | A1 | 3/2017 | Rowley et al. |
| 2017/0080641 | A1 | 3/2017 | El-Siblani |
| 2017/0100899 | A1 | 4/2017 | El-Siblani et al. |
| 2017/0172765 | A1 | 6/2017 | Solorzano et al. |
| 2017/0216498 | A1* | 8/2017 | Kang .................. A61L 31/047 |
| 2017/0225393 | A1 | 8/2017 | Shkolnik |
| 2017/0348458 | A1 | 12/2017 | Kesti et al. |
| 2017/0368225 | A1 | 12/2017 | Gatenholm |
| 2018/0071740 | A1 | 3/2018 | Brueckner et al. |
| 2018/0273904 | A1 | 9/2018 | Skardal |
| 2018/0281280 | A1 | 10/2018 | Solorzano et al. |
| 2018/0326665 | A1 | 11/2018 | Gatenholm et al. |
| 2018/0326666 | A1 | 11/2018 | Kelly et al. |
| 2018/0348247 | A1 | 12/2018 | Ando |
| 2019/0016052 | A1 | 1/2019 | Clark |
| 2019/0160203 | A1 | 5/2019 | Gatenholm |
| 2019/0209738 | A1 | 7/2019 | Gatenholm |
| 2019/0344500 | A1 | 11/2019 | Côté |
| 2020/0070421 | A1 | 3/2020 | Horn et al. |
| 2020/0071550 | A1* | 3/2020 | Gaharwar ............ C09D 11/037 |
| 2020/0139623 | A1 | 5/2020 | Kalpio et al. |
| 2020/0164103 | A1 | 5/2020 | Gatenholm |
| 2020/0206385 | A1 | 7/2020 | Gatenholm |
| 2021/0001009 | A1 | 1/2021 | Redwan et al. |
| 2021/0031456 | A1 | 2/2021 | Thayer et al. |
| 2021/0069964 | A1 | 3/2021 | Boyer et al. |
| 2021/0179871 | A1 | 6/2021 | Martinez et al. |

FOREIGN PATENT DOCUMENTS

| | | |
|---|---|---|
| DE | 202015000178 U1 | 4/2015 |
| EP | 2199380 A2 | 6/2010 |
| EP | 1732746 B1 | 4/2011 |
| EP | 2808671 A1 | 12/2014 |
| EP | 2633032 B1 | 2/2015 |
| EP | 2916158 A1 | 9/2015 |
| EP | 2975115 A1 | 1/2016 |
| EP | 3366458 A1 | 8/2018 |
| EP | 3415300 A1 | 12/2018 |
| EP | 3463822 A1 | 4/2019 |
| EP | 3469004 A4 | 5/2020 |
| EP | 3799571 A1 | 4/2021 |
| FI | 123988 B | 1/2014 |
| HR | PK20140564 A2 | 12/2015 |
| HR | PK20140564 B | 5/2017 |
| JP | 2000313258 A | 10/2000 |
| JP | 2005003610 A | 1/2005 |
| JP | 2013181167 A | 9/2013 |
| JP | 2013541956 A | 11/2013 |
| KR | 101502236 B1 | 3/2015 |
| WO | 2004092672 A2 | 10/2004 |
| WO | 2008055533 A1 | 5/2008 |
| WO | 2008122661 A1 | 10/2008 |
| WO | 2009053100 | 5/2010 |
| WO | 2012051718 A1 | 4/2012 |
| WO | 2012056109 A2 | 5/2012 |
| WO | 2012056111 A2 | 5/2012 |
| WO | 2012071578 A2 | 5/2012 |
| WO | 2012056110 A3 | 6/2012 |
| WO | 2012024675 A9 | 2/2013 |
| WO | 2014049204 A1 | 4/2014 |
| WO | 2015066705 A1 | 5/2015 |
| WO | 2015101712 A1 | 7/2015 |
| WO | 2015164844 A1 | 10/2015 |
| WO | 2015175457 A1 | 11/2015 |
| WO | 2015148646 A3 | 1/2016 |
| WO | 2016091336 A1 | 6/2016 |
| WO | 2016092106 A1 | 6/2016 |
| WO | 2016100856 A1 | 6/2016 |
| WO | 2017040675 A1 | 3/2017 |
| WO | 2017109394 A1 | 6/2017 |
| WO | 2017109395 A1 | 6/2017 |
| WO | 2017115056 A1 | 7/2017 |
| WO | 2017152142 A1 | 9/2017 |
| WO | 2017184839 A1 | 10/2017 |
| WO | 2017210663 A1 | 12/2017 |
| WO | 2017214592 A1 | 12/2017 |
| WO | 2018119989 A1 | 7/2018 |
| WO | 2018169965 A1 | 9/2018 |
| WO | 2018234837 A1 | 12/2018 |
| WO | 2019043529 A1 | 3/2019 |
| WO | 2019109127 A1 | 6/2019 |
| WO | 2019145795 A2 | 8/2019 |
| WO | 2019246623 A9 | 2/2020 |
| WO | 2020077118 A1 | 4/2020 |
| WO | 2020086941 A1 | 4/2020 |
| WO | 2020094913 A1 | 5/2020 |
| WO | 2020157077 A2 | 8/2020 |
| WO | 2020165322 A1 | 8/2020 |
| WO | 2020176079 A1 | 9/2020 |

OTHER PUBLICATIONS (Boyer, Christen et al.) Co-pending U.S. Appl. No. 17/011,767, filed Sep. 3, 2020, Specification, Claims, Figures.
(Gatenholm, Erik et al.) Co-pending International Application No. PCT/EP2020/052062, filed Jan. 28, 2020, Specification, Claims, Figures, 49 pages (See WO2020157077).
(Gatenholm, Paul) Co-pending U.S. Appl. No. 15/537,154, filed Jun. 16, 2017, Specification, Claims, Figures.

(56) References Cited

OTHER PUBLICATIONS (Gatenholm, Paul) Co-pending U.S. Appl. No. 16/306,436, filed Nov. 30, 2018, Specification, Claims, Figures.
(Gatenholm, Paul) Co-pending U.S. Appl. No. 16/307,852, filed Dec. 6, 2018, Specification, Claims, Figures.
(Gatenholm, Paul) Co-pending U.S. Appl. No. 16/777,146, filed Jan. 30, 2020, Specification, Claims, Figures.
(Gatenholm, Paul) Co-pending U.S. Appl. No. 16/799,062, filed Feb. 24, 2020, Specification, Claims, Figures.
(Gatenholm, Paul) Co-pending European Application No. 17807642.8 filed Jan. 3, 2019, Specification, Claims, Figures.
(Gatenholm, Paul) Co-pending European Patent Application No. 15871191.1 filed Jul. 18, 2017, Specification, Claims, Figures (See WO2016100856).
(Gatenholm, Paul) Co-pending European Patent Application No. 17811137.3, filed Jan. 2, 2019, Claims (Attached), Specification, and Figures (See PCT/US17/036895).
(Gatenholm, Paul) Co-pending International Patent Application No. PCT/US15/66755 filed Dec. 18, 2015, published as WO 2016/100856 on Jun. 23, 2016, Specification, Claims, Figures.
(Gatenholm, Paul) Co-pending International Patent Application No. PCT/US17/035861 filed Jun. 3, 2017, published as WO 2017/210663 on Dec. 7, 2017, Specification, Claims, Figures.
(Gatenholm, Paul) Co-pending International Patent Application No. PCT/US17/036895, filed Jun. 9, 2017, which published as WO 2017/214592 on Dec. 14, 2017, Specification, Claims, Figures.
(Gatenholm, Paul) Co-pending Japanese Application No. 2018-564332, filed on Dec. 7, 2018, Specification, Claims, and Figures (see PCT/US17/36895).
(Gatenholm, Paul) Co-pending Japanese Application No. 2019-516082 filed Nov. 30, 2018, Specification, Claims, Figures (see PCT/US17/35861).
(Martinez, Hector et al.) Co-pending International Application No. PCT/EP2020/053721, filed Feb. 13, 2020, Specification, Claims, Figures, 46 pages (See WO2020/165322).
(Redwan, Adel Itadele Namro et al.) Co-pending International Application No. PCT/US19/58025, filed Oct. 25, 2019, Specification, Claims, Figures.
(Redwan, Adel Itedale Namro et al.) Co-Pending U.S. Appl. No. 16/979,452, filed Sep. 9, 2020, Specification, Claims, Figures.
(Redwan, Adel Itedale Namro et al.) Co-pending European Patent Application No. 19874873.3 filed Dec. 29, 2020, Specification and Figures (See PCT/US2019/058025) and amended claims (3 pages).
(Redwan, Adel Itedale Namro et al.) Co-pending Japanese Application No. 2020-549630, filed Sep. 15, 2020, Specification, Claims, Figures (see PCT/US19/58025).
(Redwan, Adel Itedale Namro et al.) Co-pending Korean Application No. 10-2020-7031999 filed Nov. 5, 2020, Specification, Claims, and Figures (See PCT/2019/058025).
(Thayer, Patrick et al.) Co-Pending U.S. Appl. No. 16/964,899 filed Jul. 24, 2020, Specification, Claims, Figures.
(Thayer, Patrick et al.) Co-pending Application No. PCT/IB2019/000215, filed Jan. 25, 2019, Specification, Claims, and Figures.
Ahadian et al. "Bioconjugated Hydrogels for Tissue Engineering and Regenerative Medicine," Bioconjuoate Chem. Jul. 15, 2015 (Jul. 15, 2015) vol. 26, Iss.10, pp. 1984-2001.
Andrade et al. "Improving the Affinity of Fibroblasts for Bacterial Cellulose Using .—Carbohydrate-Binding Modules Fused to RGD," Journal of Biomedical Materials Research Jan. 22, 2009 (Jan. 22, 2009) vol. 92, Iss. 1, pp. 9-17.
Bäckdahl, H., Esguerra, M., Delbro, D., Risberg, B., and Gatenholm, P., Engineering microporosity in bacterial cellulose scaffolds, Journal of Tissue Engineering and Regenerative Medicine, 2 (6), 320-330 (2008).
Co-Pending U.S. Appl. No. 15/537,154 Non-Final Office Action dated Feb. 27, 2019, 6 pages.
Co-Pending U.S. Appl. No. 15/537,154 Notice of Allowance dated Apr. 28, 2020, 6 pages.
Co-Pending U.S. Appl. No. 15/537,154 Official Interview Summary dated Mar. 13, 2019, 3 pages.
Co-Pending U.S. Appl. No. 15/537,154 Preliminary Amendment filed Jun. 16, 2017, 7 pages.
Co-Pending U.S. Appl. No. 15/537,154 Response to Feb. 27, 2019 Non-Final Office Action, filed Mar. 18, 2019, 6 pages.
Co-Pending U.S. Appl. No. 15/537,154 Response to Oct. 18, 2018 Restriction Requirement, dated Dec. 18, 2018, 7 pages.
Co-Pending U.S. Appl. No. 15/537,154 Restriction Requirement dated Oct. 18, 2018, 8 pages.
Co-Pending U.S. Appl. No. 15/537,154 Supplemental Notice of Allowance dated May 5, 2020, 3 pages.
Co-Pending U.S. Appl. No. 16/306,436, Preliminary Amendment filed Nov. 30, 2018, 5 pages.
Co-Pending U.S. Appl. No. 16/307,852, Preliminary Amendment filed Dec. 6, 2018, 8 pages.
Co-Pending U.S. Appl. No. 16/777,146, Preliminary Amendment, filed Jan. 30, 2020, 5 pages.
Co-Pending U.S. Appl. No. 16/964,899 Preliminary Amendment filed Jul. 24, 2020, 6 pages.
Co-Pending U.S. Appl. No. 16/979,452, Preliminary Amendment filed Sep. 9, 2020, 8 pages.
Co-Pending U.S. Appl. No. 16/979,452, Restriction Requirement dated Mar. 10, 2021, 11 pages.
Co-Pending Application No. PCT/IB2019/000215, International Preliminary Report on Patentability, 14 pages.
Co-Pending Application No. PCT/IB2019/000215, International Search Report and Written Opinion dated Feb. 9, 2019 and Written Opinion dated Jul. 4, 2019, 20 pages.
Co-Pending Application No. PCT/US19/19664, International Search Report and Written Opinion dated Jun. 6, 2019, 11 pages.
Co-Pending European Application No. 17807642.8, Response to Jul. 3, 2020 Communication pursuant to Rules 70(2) and 70a(2) EPC filed Jan. 13, 2021, 12 pages.
Co-Pending European Patent Application No. 15871191.1, File History, Nov. 2019 to Feb. 2020, 30 pages.
Co-Pending European Patent Application No. 15871191.1, File History, Oct. 2018 to Jul. 2019, 28 pages.
Co-Pending European Patent Application No. 15871191.1, Letter and Communication pursuant to Rule 114(2) EPC, dated Jun. 12, 2018, 7 pages.
Co-Pending European Patent Application No. 15871191.1, Supplemental Search and Opinion, dated Sep. 18, 2018, 8 pages.
Co-Pending European Patent Application No. 17807642.8 Communication Pursuant to Rule 164(1) dated Jan. 27, 2020, 19 pages.
Co-Pending European Patent Application No. 17807642.8 Communication Pursuant to Rules 161(2) and 162 EPC dated Feb. 1, 2019, 4 pages.
Co-Pending European Patent Application No. 17807642.8 Response to Jan. 27, 2020 Communication Pursuant to Rule 164(1) filed Apr. 8, 2020, 3 pages.
Co-Pending European Patent Application No. 17807642.8, Extended European Search Report dated Jun. 16, 2020, 21 pages.
Co-Pending European Patent Application No. 17811137.3, Communication under Article 94(3) EPC dated Dec. 10, 2020, 6 pages.
Co-Pending European Patent Application No. 17811137.3, Extended European Search Report dated Apr. 2, 2020, 9 pages.
Co-Pending European Patent Application No. 17811137.3, Response to Apr. 1, 2020 Communication pursuant to Rules 70(2) and 70a(2) EPC filed Oct. 30, 2020, 11 pages.
Co-Pending International Application No. PCT/EP2020/052062, International Search Report and Written Opinion, dated Aug. 24, 2020, 19 pages.
Co-Pending International Application No. PCT/EP2020/053721, International Search Report and Written Opinion, dated May 18, 2020, 11 pages.
Co-Pending International Application No. PCT/US19/58025, International Search Report and Written Opinion dated Feb. 6, 2020, 10 pages.
Co-Pending International Patent Application No. PCT/US15/66755, International Preliminary Reporton Patentability dated Jun. 20, 2017, 6 pages.
Co-Pending International Patent Application No. PCT/US15/66755, International Search Report and Written Opinion dated Apr. 28, 2016, 8 pages.

(56) References Cited

OTHER PUBLICATIONS

Co-Pending International Patent Application No. PCT/US 17/035861 filed Jun. 3, 2017, International Preliminary Report on Patentability dated Dec. 4, 2018, 11 pages.

Co-Pending International Patent Application No. PCT/US17/035861 International Search Report and Written Opinion dated Aug. 17, 2017, 14 pages.

Co-Pending International Patent Application No. PCT/US17/036895, International Preliminary Report on Patentability dated Aug. 17, 2017, 7 pages.

Co-Pending International Patent Application No. PCT/US17/036895, International Search Report and Written Opinion dated Sep. 6, 2017, 9 pages.

Co-Pending International Patent Application No. PCT/US2017/035861 filed Jun. 3, 2017, International Search Report and Written Opinion dated Aug. 17, 2017.

Co-Pending Japanese Application No. 2020-549630, English Version of Claims filed Nov. 27, 2020, 3 pages.

D. Gethin, A. Rees et al., "Studies on the 3D Printing of Nanocellulose Structures", Advances in Printing and Media Technology, vol. XLI(I), A2, (2014), 91-95.

Fink, Helen et al. Bacterial cellulose modified with xyloglucan bearing the adhesion peptide RGD promotes endothelia cell adhesion and metabolism—a promising modification for vascular grafts, Journal of Tissue Engineering and Regenerative Medicine, vol. 5, No. 6, Jun. 1, 2011, pp. 454-463.

Gatenholm P. et al. Bacteria fabricate 3D scaffolds for organ regeneration, Symposium 13: Biomedical research. New Biotechnology, Jul. 2014, vol. 31S, p. S52.

Guerreiro, Susana G. et al. Neonatal Human Dermal Fibroblasts Immobilized in RGD-Alginate Induce Angiogenesis. Cell Transplantation, 23, 2014, 945-957.

Helenius G, H. Backdahl, A. Bodin, U. Nanmark, P. Gatenholm, B. Risberg, In vivo Biocompatibility of Bacterial Cellulose, J. Biomed. Mater. Res. A., 76, 431-438, 2005.

Huh et al. "From 3D Cell Culture to Organs-on-Chips," Trends Cell Biol. Dec. 1, 2011 (Dec. 1, 2011), vol. 21,155.12, pp. 745-754.

J.A. Rowley, G. Madlambayan, D.J Mooney, Alginate hydrogels as synthetic extracellular matrix materials, Biomaterials 20 (1999), 45-53.

Jia et al. "Engineering Alginate as a Bioink for Bioprinting," Acta Biomater. Oct. 1, 2015 (Oct. 1, 2015), vol. 10, Iss. 10, pp. 4323-4331.

Johnson, H. Y. Chung et al. Bio-ink properties and printability for extrusion printing living cells. Biomater. Sci. 2013, 1, 763-773.

Kunt, Emrah Deniz "Microfactory Concept with Bilevel Modularity" Graduate School of Engineering and Natural Sciences, Sabanci University, Fall 2011, 194 pages.

Kuzmenko, Y, S. Saemfors, D. Haegg, and P. Gatenholm, Universal method for protein bioconjugation with nanocellulose scaffolds for increased cell adhesion. Mater. Sci. Eng., C,2013. 33(8): p. 4599-4607.

L.Nimeskern, et al., "Mechanical evaluation of bacterial nanocellulose as an implant material for ear cartilage replacement", Journal of the Mechanical Behaviour of Biomedical Materials, 22 (2013), 12-21.

Lee, K. Y. and Mooney, D. J. Alginate: Properties and biomedical applications. Progress in Polymer Science, 37, 2012, 106-126.

Markstedt et al. "3D Bioprinting Human Chondrocytes with Nanocellulose-Alginate Bioink—for Cartilage Tissue Engineering Applications," Bio Macromolecules, Mar. 25, 2015 (Mar. 25, 2015) vol. 16, Iss. 5, pp. 1489-1496.

Martinez Avila, Hector et al.. 3D bioprinting of human chondrocyte-laden nanocellulose hydrogels for patient-specific auricular cartilage regeneration. Bioprinting. vol. 1-2, Mar. 1, 2016, pp. 22-35.

Martinez, Hector Avila, S. Schwarz, E.M. Feldmann, A. Mantas, A. Von Bomhard, P. Gatenholm, and N. Rotter, Biocompatibility evaluation of densified bacterial nanocellulose hydrogel as an implant material for auricular cartilage regeneration. Appl. Microbiol. Biotechnol., 2014. 98(17): p. 7423-7435.

Michael, S. et al. Tissue Engineered Skin Substitutes Created by Laser-Assisted Bioprinting Form Skin-Like Structures in the Dorsal Skin Fold Chamber in Mice. PLOS. Mar. 4, 2013; vol. 8, No. 3, pp. 1-12; doi:10.1371/journal.pone.0057741.

Murphy S. V et al. 3D bioprinting of tissues and organs. Nature Biotechnology, Aug. 2014, vol. 32, No. 8, p. 773-785.

Nakamura et al. "Biomatrices and Biomaterials for Future Developments of Bioprinting and Biofabrication," Biofabrication, Mar. 10, 2010 (Mar. 10, 2010) vol. 2, Iss. 1, pp. 1-6.

Panwar et al. "Current Status of Bioinks for Micro-Extrusion-Based 3D Bioprinting Molecules," Molecules, May 25, 2016 (May 25, 2016) vol. 21, Iss. 6, pp. 1-26.

Petersen N, Gatenholm, P., Bacterial cellulose-based materials and medical devices: current state and perspectives, Applied Microbiology and Biotechnology, 91, 1277, 2011.

Qing, Gao et al. Coxial nozzle-assisted 3D bioprinting with built-in microchannels for nutrients delivery. Biomaterials, 61, 2015, 203-215.

Rutz et al. "A Multi-Material Bioink Method for 3D Printing Tunable, Cell-Compatible-Hydrogels," Adv Mater. Mar. 4, 2015 (Mar. 4, 2015), vol. 27, Iss. 9, pp. 1-18.

Salas, C et al. Nanocellulose properties and applications in colloids and interfaces. Current Opinion in Colloid and Interface Science. Oct. 30, 2014, vol. 19, No. 5, pp. 383-396.

Teelahti, Toimi "Implementing Additive Manufacturing in Microfactories." M.Sc. Thesis, Tampere University of Technology, 2014, 71 pages.

United States Pharmacopeia and National Formulary. Rockville, MD: United States Pharmacopeial Convention; 2016.

Ventola C.L. Medical Applications for 3D Printing: Current and Projected Uses. P&T, Oct. 2014, vol. 39 No. 10, p. 704-711.

Xu, Mingen et al. An cell-assembly derived physiological 3D model of the metabolic syndrome, based on adipose-derived stromal cells and a gelatin/alginate/fibrinogen matrix. Biomaterials 31 (2010) 3868-3877.

Zhou, Y; The Application of Ultrasound in 3D Bio-Printing. Molecules. May 5, 2016, vol. 21 No. 590; pp. 1-25.

(Martinez, Hector et al.) Co-pending International Application No. PCT/US19/55684, filed Oct. 10, 2019, Specification, Claims, Figures.

Bovine Collagen Solution, Sigma Aldrich, 2020, https://www.sigmaaldrich.com/catalog/product/aldrich/804614?lang=en&region=US. (International Search Report of PCT/US2019/055684 dated Jan. 28, 2020 indicates this reference was retrieved as early as Jan. 6, 2020. This copy retrieved Apr. 14, 2020.).

Co-Pending International Application No. PCT/US19/55684, International Search Report and Written Opinion dated Jan. 28, 2020, 8 pages.

Apelgren, P. et al., PLoS One, "Chondrocytes and stem cells in 3D-bioprinted structures create human cartilage in vivo", published Dec. 13, 2017, vol. 12, No. 12, 16 pages.

Co-Pending U.S. Appl. No. 16/306,436, Restriction Requirement dated Jun. 28, 2021, 11 pages.

Co-Pending U.S. Appl. No. 16/979,452, Non-Final Office Action dated Mar. 30, 2021, 16 pages.

Co-Pending U.S. Appl. No. 16/979,452, Response to Mar. 10, 2021 Restriction Requirement dated Mar. 17, 2021, 3 pages.

Co-Pending European Patent Application No. 17811137.3, Response to Dec. 10, 2020 Communication under Article 94(3) EPC, filed Jun. 21, 2021, 15 pages.

Co-Pending Japanese Application No. 2018-564332, Office Action dated May 14, 2021, 9 pages and English Translation, 10 pages.

Co-Pending Japanese Application No. 2019-516082, First Office Action dated Mar. 1, 2021 (3 pages) and English Translation (4 pages).

Co-Pending Korean Application No. 10-2020-7031999 Voluntary Amendment filed Apr. 2, 2021 (15 pages) with English version of the amended claims (5 pages).

Halper, J.; Kjaer, M. (2014) Chapter 3: Progress in Heritable Soft Connective Tissue Diseases. Advances in Experimental Medicine and Biology, vol. 802, 26 pages.

(56) References Cited

OTHER PUBLICATIONS

Kumar, A. et al. Carbohydrate Polymers, "Application of xanthan gum as polysaccharide in tissue engineering: A review", published online Oct. 5, 2017, vol. 180 pp. 128-144.

* cited by examiner

CROSSLINKED

UN-CROSSLINKED

DOUBLE NETWORK BIOINKS

CROSS-REFERENCE TO RELATED APPLICATIONS

The present application is a National Stage application under 35 U.S.C. 371 of International Application No. PCT/US19/55684, filed Oct. 10, 2019, which application claims priority to and the benefit of the filing date of U.S. Provisional Application Nos. 62/744,034, filed Oct. 10, 2018 and 62/748,948, filed Oct. 22, 2018. The disclosures of each of these applications are hereby incorporated by reference herein in their entireties.

BACKGROUND OF THE INVENTION

Field of the Invention

The present invention relates to a double network bioink that is customizable and tailorable in terms of mechanical characteristics, diffusivity, and biological functionality that is printable at room temperature and cytocompatible.

The present invention also relates to a double network bioink that can be utilized as a standard for comparison and evaluation of bioinks and during calibration.

The present invention also relates to a double network bioink that is suited for the education field as a 'blank slate' bioink that can be utilized to convey different scientific concepts.

SUMMARY OF THE INVENTION

Embodiments of the present invention provide a bioink that is comprised of a double network hydrogel. The double network includes a non-crosslinkable thickener and a crosslinkable polyethylene glycol-based network that interpenetrate each other The bioink is a blank slate in terms of customization. Furthermore, the resulting mechanical properties, diffusivity, and biological properties can be tailored through addition of pendant groups that can link to the polyethylene glycol-based network.

Specific embodiments include Embodiment 1, which is a bioink comprising: one or more biocompatible or non-biocompatible thickener; one or more polyethylene glycol based crosslinkable network; one or more photoinitiator; and/or optionally, additives to impart one or more desired or different characteristics; wherein the thickener and polyethylene glycol based crosslinkable network form a structure comprising two interpenetrating networks.

Such embodiments include Embodiment 2, which is the bioink of Embodiment 1, wherein the thickener comprises one or more of: polyethylene oxide; polypropylene oxide; nanofibrillar cellulose; nanocrystalline cellulose; gelatin; collagen; glucomannon; alginate; k-carrageenan; bentonite clay; and/or xanthan gum.

Embodiment 3 is the bioink of Embodiments 1 or 2, where the thickener comprises polyethylene oxide having an average molecular weight of: 100,000 Daltons; 200,000 Daltons; 300,000 Daltons; 400,000 Daltons; 600,000 Daltons; 900,000 Daltons; 1,000,000 Daltons; 2,000,000 Daltons; 4,000,000 Daltons; 5,000,000 Daltons; or 8,000,000 Daltons, or any range or value encompassed by these values.

Embodiment 4 is the bioink of any preceding Embodiment, wherein the gelatin comprises a Bloom Strength of: 150; 175; 200; 225; 250; 275; or 300.

Embodiment 5 is the bioink of any preceding Embodiment, wherein the thickener comprises alginate with molecular weights of: low molecular weight (average below 75 kDa); medium molecular weight (average between 75 and 200 kDa); or high molecular weight (average above 200 kDa).

Embodiment 6 is the bioink of any preceding Embodiment, wherein the thickener comprises alginate with a guluronic acid (G)/mannuronic acid (M) ratio of: <1 G/M; 1 G/M; or >1.5 G/M.

Embodiment 7 is the bioink of any preceding Embodiment, wherein the thickener comprises collagens comprised of: acid soluble collagen; precipitated collagen; and/or pepsin digested collagen.

Embodiment 8 is the bioink of any preceding Embodiment, wherein the cross-linkable polyethylene glycol comprises reactive groups comprising: acrylate; thiol; maleimide; and/or biotin.

Embodiment 9 is the bioink of any preceding Embodiment, wherein the polyethylene glycol crosslinker has a molecular weight of: 660 Daltons; 1000 Daltons; 2000 Daltons; 3400 Daltons; 5000 Daltons; 10000 Daltons; 20000 Daltons; or 35000 Daltons.

Embodiment 10 is the bioink of any preceding Embodiment, wherein the polyethylene glycol crosslinker exhibits structures or blends comprising: linear; branched; 4-arm; 8-arm; and/or hyperbranched.

Embodiment 11 is the bioink of any preceding Embodiment, wherein the additives comprise monoacrylate PEG with functionalization of the following: fluorescent groups such as: fluorescein; rhodamine; or dansyl; sulfonate groups; amine groups; phosphate groups; lipid groups; and/or CNT binding.

Embodiment 12 is the bioink of any preceding Embodiment, comprising mPEG-PEG-Phosphate groups which comprise an average molecular weight of: 1000 Daltons; 2000 Daltons; 5000 Daltons; 10000 Daltons; 20000 Daltons; 30000 Daltons; or 40000 Daltons, or any range or value encompassed by these values.

Embodiment 13 is the bioink of any preceding Embodiment, wherein the photoinitiator comprises: Irgacure 2959; LAP; Eosin-Y; and/or Avidin.

Embodiment 14 is a method of forming a double network structure comprising: providing a bioink, wherein the bioink comprises: one or more thickener, one or more cross-linkable polymer, one or more photoinitiator, and optionally comprising one or more additives, and subjecting the bioink to one or more light sources (such as a laser) to induce the cross-linkable polymer to form a first network in the presence of the thickener, which thickener provides a second non-crosslinkable network, wherein together the first and second networks are interpenetrating networks providing a double network structure.

BRIEF DESCRIPTION OF THE DRAWINGS

The following drawings illustrate certain aspects of some embodiments of the invention, and should not be used to limit or define the invention. Together with the written description, the drawings serve to explain and illustrate certain principles of the invention.

DETAILED DESCRIPTION OF VARIOUS EMBODIMENTS OF THE INVENTION

Figure 1B:
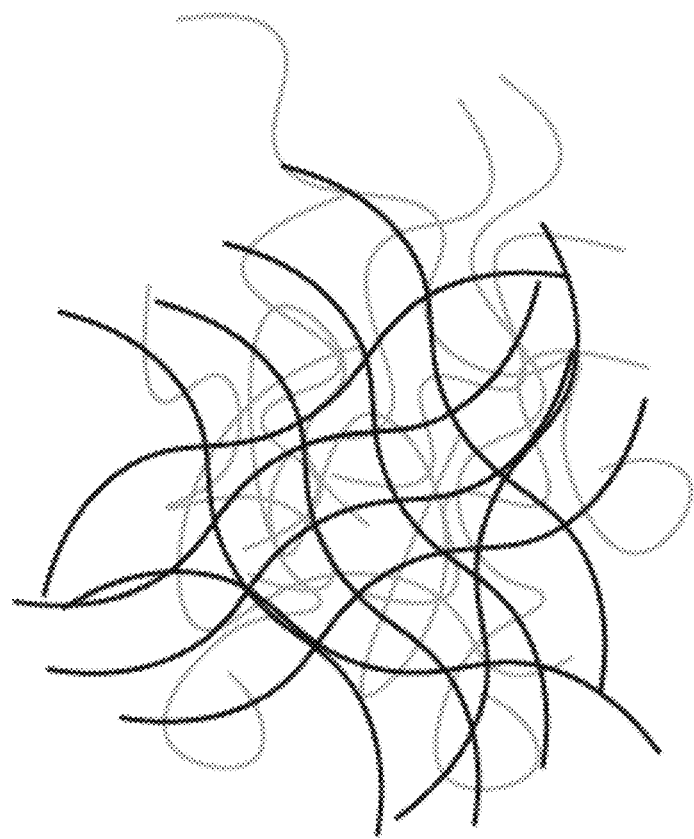
FIG. 1B is a schematic showing components of a crosslinked bioink.

Reference will now be made in detail to various exemplary embodiments of the invention. It is to be understood that the following discussion of exemplary embodiments is not intended as a limitation on the invention. Rather, the following discussion is provided to give the reader a more detailed understanding of certain aspects and features of the invention.

Definitions

The following definitions are provided to facilitate understanding of certain terms provided in this specification. For other terms not defined herein, the ordinary meaning as recognized by an ordinarily-skilled artisan should be applied.

Bioink: a biomaterial that can be used in its present state or has been adapted for use within a 3D bioprinter system. Bioinks must both support cell viability and maintain structural support during and after the deposition process.

Bioprinting: the utilization of 3D printing and 3D printing-like techniques to combine cells, growth factors, and biomaterials to fabricate biomedical parts that maximally imitate natural tissue characteristics.

Bioink Standard: a bioink that has standardized characteristics for comparison to and evaluation of different bioinks. Standardized characteristics can include concentrations, swelling ratio, hydrophobicity, compressive strength, elastic strength, viscoelastic behavior, gelation point, degradation, color, crosslinking speed.

Swelling Ratio: Volume increase of a biomaterial construct after it is submerged in a water bath, saline solution, or cell media.

Hydrophobicity: The tendency of a biomaterial to repel or absorb water.

Compressive Strength: The resistance of a bioink or construct to compression.

Elastic Strength: The stiffness of the bioink under linear deformation.

Gelation Point: the point by which a biomaterial begins to possess storage modulus whether through chain entanglement or self-assembly.

Chain Entanglement: A mechanism of gelation by which chains form physical entanglements with each other, often driven by temperature.

Self-Assembly: the process by which a material assembles into a different state under the right thermal and energetic conditions.

Opacity: the transmission of light through the biomaterial.

Cross-linking: The process by with a biomaterial changes from a non-permanent state of gelation to a permanent state through the introduction of a reactive species to form physical cross-links between adjacent polymer chains Kinetics: The rate by which a cross-linking reaction proceeds.

Degradation: the physical, chemical, and/or enzymatic deterioration of a biomaterial into its byproducts. Degradation is dependent on the physical and chemical characteristic of the biomaterial.

Calibration Standard: A bioink that is utilized to establish or verify parameters to prepare a bioprinter for bioprinting.

Diffusivity: A characteristic of a hydrogel material based on the rate that a molecule moves through the network. Diffusivity is dependent on the characteristics of the network itself, including mesh size, surface charge, presence of binding groups.

Double Network: A material that includes two interpenetrating networks. The bulk of the material is known as a thickener. This thickener is non-crosslinked and provides structure to the network. The second network is the cross-linkable network that provides rigidity to the structure. A double network can include a plurality of networks, but preferably two, and with at least one network being a non-crosslinkable network and at least one network being a cross-linkable network.

Thickener: A non-crosslinkable natural or synthetic polymer network that can exhibit shear-thinning properties, or increase viscosity of a blend. If not blended with a cross-linked network, the thickener material will be diluted away.

Figure 1A:
FIG. 1A is a schematic showing a structure of an uncrosslinked bioink.

Network Preparation Methods: The inventive bioinks are prepared by combining/mixing the components under conditions that avoid formation of the double network until desired. The bioinks can be used to form structures (such as biocompatible structures and/or scaffolds) comprising a plurality of networks. Preferably, the bioinks can be used to form double networks. To make a double network two or more polymer precursor solutions are mixed together. The precursor solutions are selected such that one network will crosslink or entangle at a different time than the other components. For example, a PEGDA precursor solution is mixed with a non-crosslinkable thickener that forms a physical network. During the mixing process both networks can be blended together. A photoinitiator is also blended into this material. This blend can then be crosslinked under UV light to crosslink the PEGDA precursor solution and 'lock in' the thickener network (FIGS. 1A-1B). This creates the double network. A double network can also be created by using a crosslinkable network that self-assembles under heat or normal molecular interactions. Methods of forming double networks can also include providing a bioink comprising one or more thickener, one or more cross-linkable polymer, one or more photoinitiator, and optionally comprising one or more additives, and subjecting the bioink to one or more light sources (such as a laser) to induce the cross-linkable polymer to form a first network in the presence of the thickener, which thickener forms/provides a second non-crosslinkable network, and together the first and second networks are interpenetrating networks providing a double network structure. To facilitate formation of either or both of the first and second networks, the components can be allowed to interact at a temperature ranging from 0-180 degrees C., such as at room temperature for a period of 5 seconds to 24 hours or more. In embodiments, the bioink can comprise as the cross-linkable polymer a polyethylene glycol based crosslinkable polymer and as the thickener one or more of polyethylene oxide, polypropylene oxide, nanofibrillar cellulose, nanocrystalline cellulose, gelatin, collagen, glucomannon, alginate, k-carrageenan, bentonite clay, and/or xanthan gum.

Educational Bioink: A bioink that is developed for the purpose of conveying a scientific concept.

Blank Slate: A bioink that is inert in its base functionality but can be easily customized toward different applications based on one or more additives.

EXAMPLES/APPLICATIONS

Figure 2:
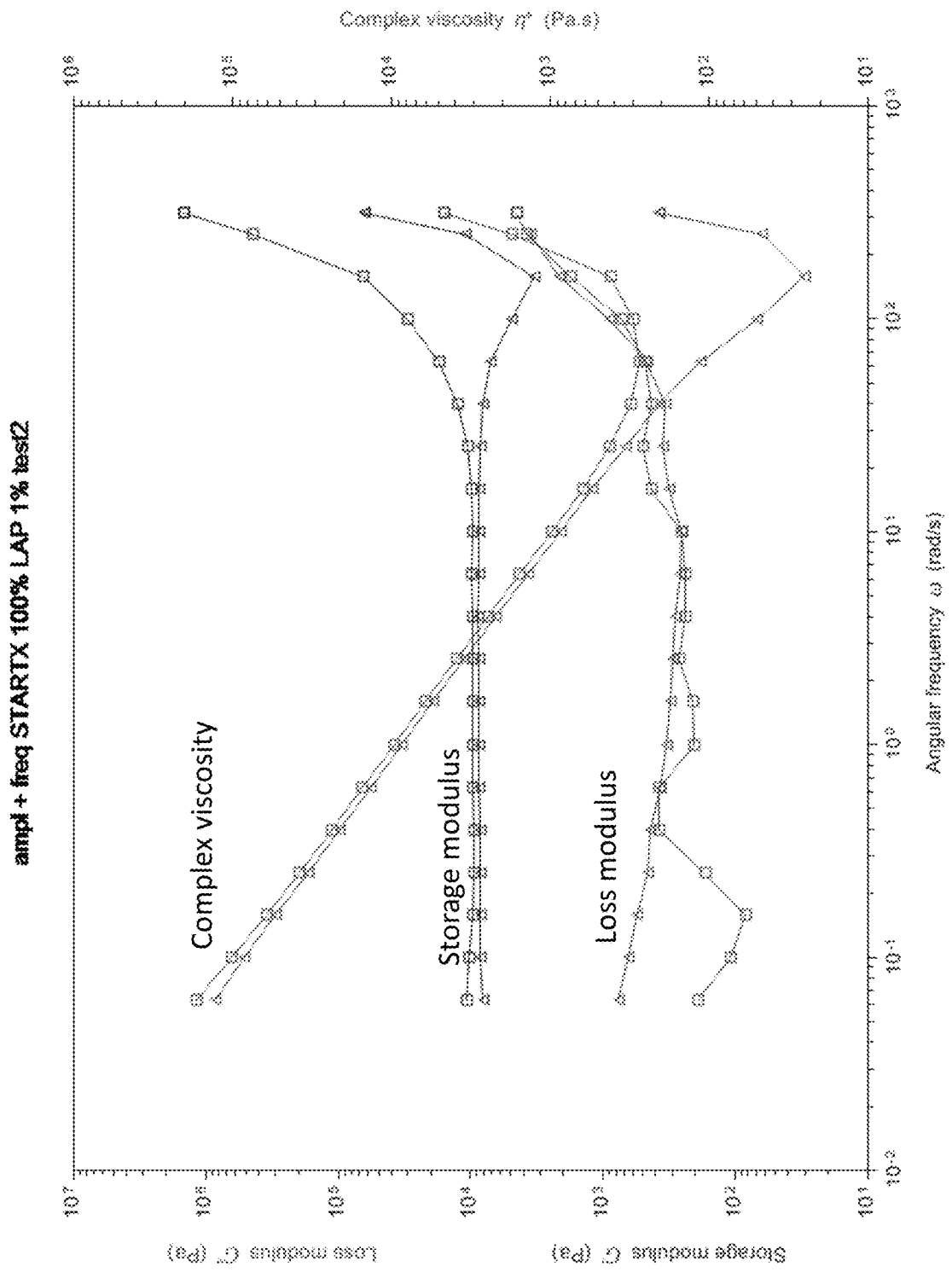
FIGS. 2-4 are graphs showing viscosity, storage modulus, and loss modulus for representative bioink compositions made according to embodiments of the invention.
Figure 3:
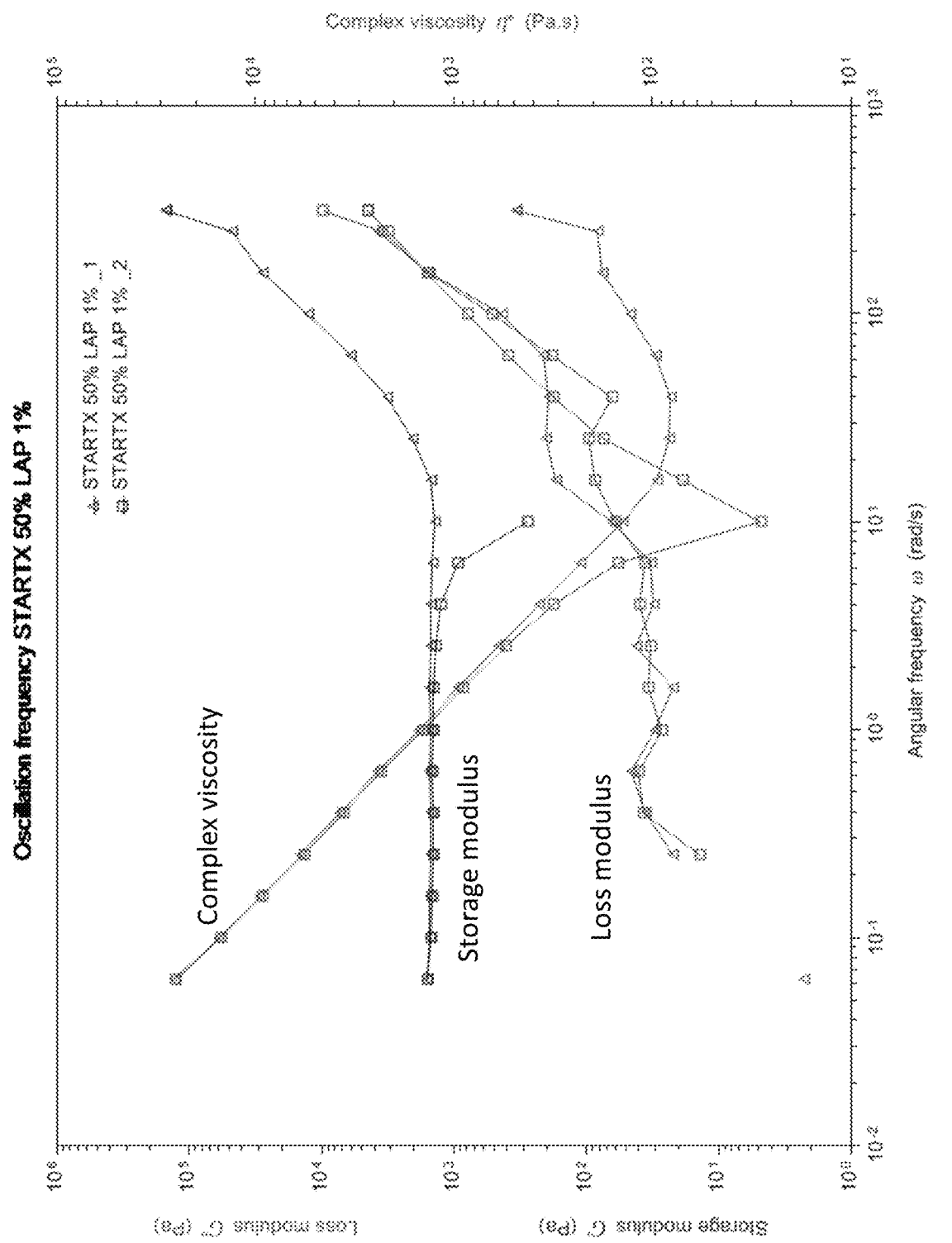
Figure 4:
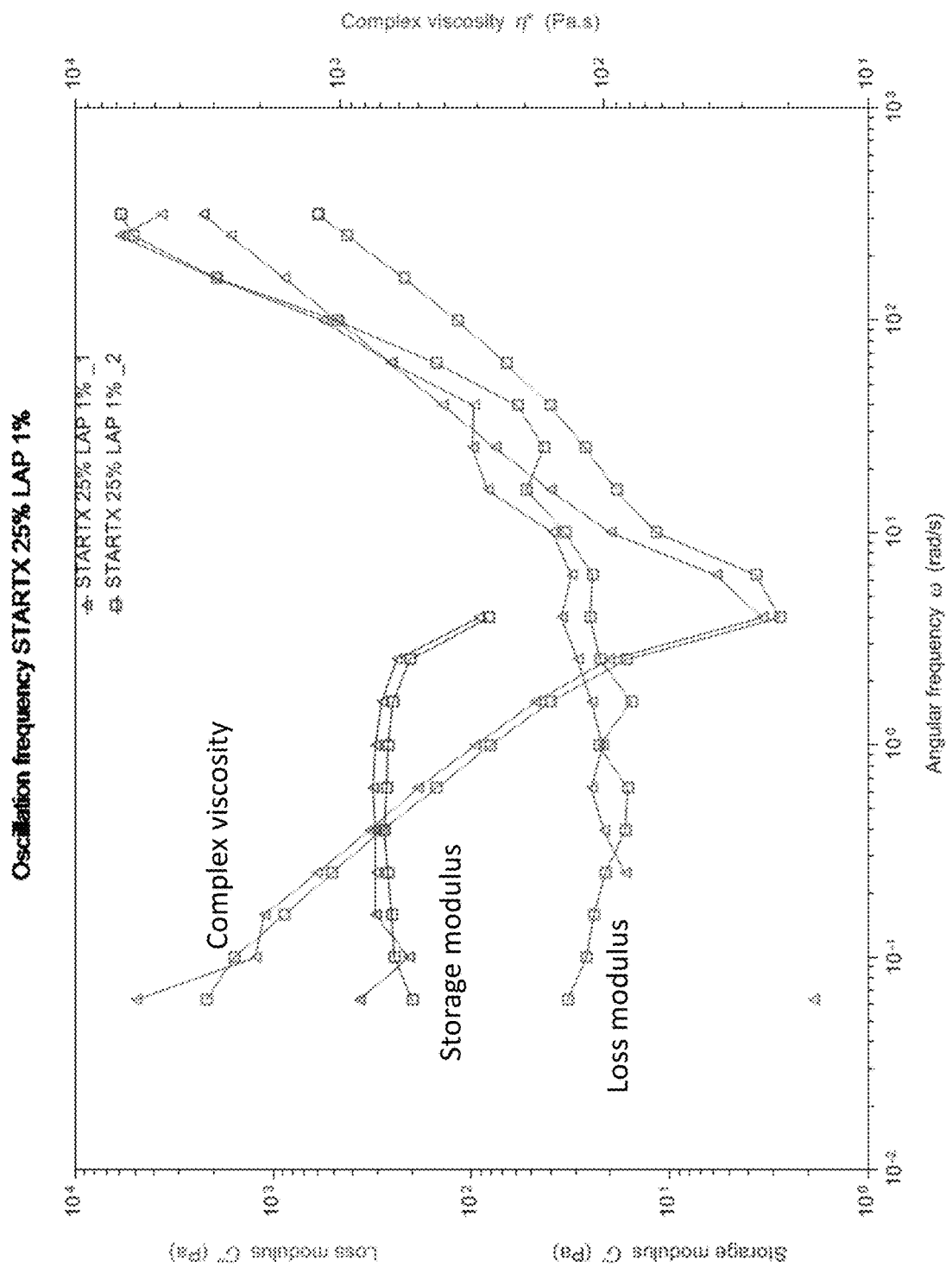

FIGS. 2-4 show various characteristics for bioink compositions made according to embodiments of the invention. The results show that the mechanical stiffness of the bioink can be tailored by changing its composition while not effecting its printability. This allows different standardized constructs to be made that can exhibit distinct mechanical characteristics. This tailoring allows constructs to be exposed to distinct mechanical environments. Additionally, it allows the development of more stable support structures that match the properties of the bioprinted constructs better. This eliminates the chance that a mechanical gradient can develop that will affect cell behavior negatively.

An exemplary bioink composition according to embodiments of the invention can include (a) one or more thickener present in an amount ranging from 0.1% to 20% w/v of the composition, (b) one or more PEGDA crosslinker present in an amount ranging from 0.1% to 10% w/v of the composition, (c) one or more photoinitiator present in an amount ranging from 0.05% to 1% w/v of the composition, and (d) optionally one or more supplementary proteins present in an amount ranging from 0.01% to 10% w/v of the composition, with the remainder comprising water and salts. By varying the type and/or amount of any one or more of the thickener, PEGDA crosslinker and/or photoinitiator, the mechanical stiffness, the diffusivity, the elasticity, binding capacity, etc. of the construct can be varied. An application of embodiments of this bioink is in the field of surgical models. The elasticity and stiffness of the cross-linked bioink can be controlled by changing the blending ratio between the thickener, cross-linking polymer, and the concentration of the photoinitiator.

Embodiments of the double network bioink can be utilized as a base material for surgical models. These surgical models can be customized and made more complex through the use of specialized double network bioinks. In order to fabricate a surgical model, variations of the double network bioink that exhibit different mechanical characteristics can be utilized for different tissues. Additionally, sacrificial bioinks such as pluronics can be used.

Embodiments of the double network bioink can be utilized as a base material to physically or chemically secure a bioprinted construct to a surface. A variation of this double network bioink can lack the necessary components that facilitate the adhesion or migration of cells. Additionally, the double network bioink can be partially crosslinked or non-crosslinked when a bioprinted construct is placed or printed onto the surface. Polymer molecules from the double network bioink can directly entangle with the bioprinted construct. Additionally, if a bioink is utilized that contains cross-linkable groups, the bioprinted construct and the double network bioink can be directly linked together.

This Embodiments of the double network bioink can be utilized as a tailorable surface that a bioprinted construct can be deposited onto. Many cells within fibrillar hydrogel networks can sense mechanical forces of surrounding boundary points and surfaces. This is also a problem within the broader 3D cell culture and bioprinting field where cells within a construct will migrate to the tissue culture plate surface and begin to spread out from the construct. This creates boundary and edge irregularities in cell growth. The double network bioink can be bioprinted with controlled mechanical stiffness. When combined with a tissue construct, the double network ink can mask the stiffness of the well plate surface by matching the mechanical characteristics of the constructs so as to not create a gradient. Furthermore, the mechanical characteristics can be controlled to drive cell migration, if desired. Possible ratios of mechanical stiffness of the double network bioink to the construct include: 100:1, 10:1, 5:1, 1:1, 1:5, 1:10, and 1:100.

Embodiments of the double network bioink can be utilized as an elastic and pliable support material that can transmit forces and other applied stimuli to bioprinted construct via a bioreactor system. The double network hydrogel can be bioprinted into the lattice structure of a bioprinted construct and crosslinked, then can be utilized to apply mechanical stimulation such as tension and compression onto the bioprinted lattice.

Embodiments of the double network can be utilized as a reservoir for growth factor release. Through functionalization with growth factor or other small molecule binding groups such as sulfonated groups, heparins, peptides, and DNA/RNA, the bioink can be tailored to bind, sequester, and release growth factors and other molecules.

Embodiments of the double network bioink can be utilized as a component of organ-on-a-chip platforms. The bioink can be utilized as a novel material for utilization in organ-on-a-chip systems as an alternative to traditional polydimethylsiloxane (PDMS). This double network bioink can support the diffusion of nutrients and small molecules across barriers in an organ-on-a-chip system. Additionally, the bioink can be bioprinted and cross-linked concurrently with other bioinks, enabling the fabrication of an organ-on-a-chip system without the need for curing under heat or other harsh conditions found with traditional chip silicones.

Embodiments of the double network bioink can be utilized as a standardized bioink to enable mechanical comparisons between bioink materials.

Embodiments of the double network can be utilized as a prefabricated support structure such a well, trough, ring mold, or other material that can be combined with another biomaterial to fabricate scaffolding materials.

The present invention has been described with reference to particular embodiments having various features. It will be apparent to those skilled in the art that various modifications and variations can be made in the practice of the present invention without departing from the scope or spirit of the invention. One skilled in the art will recognize that these features may be used singularly or in any combination based on the requirements and specifications of a given application or design. Other embodiments of the invention will be apparent to those skilled in the art from consideration of the specification and practice of the invention. Where the term "comprising" is used, it should be understood that the disclosures equally include such embodiments "consisting essentially of" or "consisting of" the details recited as well. Where a range of values is provided in this specification, each value between the upper and lower limits of that range is also specifically disclosed. The upper and lower limits of these smaller ranges may independently be included or excluded in the range as well. As used in this specification, the singular forms "a," "an," and "the" include plural referents unless the context clearly dictates otherwise. It is intended that the specification and examples be considered as exemplary in nature and that variations that do not depart from the essence of the invention are intended to be within the scope of the invention. Further, the references cited in this disclosure are incorporated by reference herein in their entireties.

The invention claimed is:

1. A bioink comprising:
   (a) a biocompatible or non-biocompatible thickener;
   (b) a polyethylene glycol based crosslinkable network;
   (c) a photoinitiator; and/or
   (d) optionally, additives to impart different characteristics, wherein the additives comprise monoacrylate PEG with functionalization of the following:

fluorescent groups such as:
  i. fluorescein;
  ii. rhodamine; or
  iii. dansyl
sulfonate groups;
amine groups;
phosphate groups;
lipid groups; and/or
CNT binding;
wherein the thickener and polyethylene glycol based crosslinkable network form a structure comprising two interpenetrating networks; and
wherein the thickener comprises polyethylene oxide having an average molecular weight of from 100,000 Daltons to 8,000,000 Daltons.

2. The bioink of claim 1, wherein the thickener further comprises one or more of polyethylene oxide; polypropylene oxide; nanofibrillar cellulose; nanocrystalline cellulose; gelatin; collagen; glucomannon; alginate; k-carrageenan; bentonite clay; and/or xanthan gum.

3. The bioink of claim 2, wherein the gelatin comprises a bloom strength ranging from 150 to 300.

4. The bioink of claim 1, wherein the thickener further comprises alginate with a molecular weight average of below 75 kDa.

5. The bioink of claim 1, wherein the thickener further comprises alginate with a guluronic acid (G)/mannuronic acid (M) ratio of <1 G/M.

6. The bioink of claim 1, wherein the thickener further comprises collagens comprised of:
  (a) Acid soluble collagen;
  (b) Precipitated collagen; and/or
  (c) Pepsin digested collagen.

7. The bioink of claim 1, wherein the cross-linkable polyethylene glycol comprises reactive groups comprising:
  (a) Acrylate;
  (b) Thiol;
  (c) Maleimide; and/or
  (d) Biotin.

8. The bioink of claim 1, wherein the cross-linkable polyethylene glycol comprises a linear; branched; 4-arm; 8-arm; and/or hyperbranched structure.

9. The bioink of claim 1, wherein the thickener is present in an amount ranging from 0.1% to 20% w/v of the composition.

10. The bioink of claim 1, wherein the cross-linkable polyethylene glycol is PEGDA present in an amount ranging from 0.1% to 10% w/v of the composition.

11. The bioink of claim 1, wherein the photoinitiator is present in an amount ranging from 0.05% to 1% w/v of the composition.

12. The bioink of claim 1, wherein the photoinitiator comprises Irgacure 2959; LAP; Eosin-Y; and/or Avidin.

13. A bioink comprising:
a biocompatible or non-biocompatible thickener;
a polyethylene glycol based crosslinkable network;
a photoinitiator; and/or
optionally, additives to impart different characteristics;
wherein the thickener and polyethylene glycol based crosslinkable network form a structure comprising two interpenetrating networks; and
further comprising mPEG-PEG-Phosphate groups, which comprise an average molecular weight of 1000 Daltons; 2000 Daltons; 5000 Daltons; 10000 Daltons; 20000 Daltons; 30000 Daltons; or 40000 Daltons.

14. The bioink of claim 13, wherein the thickener comprises one or more of polyethylene oxide; polypropylene oxide; nanofibrillar cellulose; nanocrystalline cellulose; gelatin; collagen; glucomannon; alginate; k-carrageenan; bentonite clay; and/or xanthan gum.

15. The bioink of claim 13, wherein the thickener comprises polyethylene oxide having an average molecular weight ranging from 100,000 Daltons to 8,000,000 Daltons.

16. The bioink of claim 14, wherein the gelatin comprises a bloom strength ranging from 150 to 300.

17. The bioink of claim 13, wherein the thickener comprises alginate with an average molecular weight of below 75 kDa.

18. The bioink of claim 13, wherein the polyethylene glycol based crosslinkable network comprises cross-linkable polyethylene glycol comprising one or more reactive groups chosen from acrylate; thiol; maleimide; and/or biotin.

19. The bioink of claim 1, wherein the thickener further comprises alginate with a molecular weight average of between 75 and 200 kDa.

20. The bioink of claim 1, wherein the thickener further comprises alginate with a molecular weight average of above 200 kDa.

21. The bioink of claim 1, wherein the thickener further comprises alginate with a guluronic acid (G)/mannuronic acid (M) ratio of 1 G/M.

22. The bioink of claim 1, wherein the thickener further comprises alginate with a guluronic acid (G)/mannuronic acid (M) ratio of >1.5 G/M.

23. A bioink comprising:
  (a) a biocompatible or non-biocompatible thickener;
  (b) a polyethylene glycol based crosslinkable network;
  (c) a photoinitiator; and/or
  (d) optionally, additives to impart different characteristics, wherein the additives comprise monoacrylate PEG with functionalization of the following:
    fluorescent groups such as:
      i. fluorescein;
      ii. rhodamine; or
      iii. dansyl
    sulfonate groups;
    amine groups;
    phosphate groups;
    lipid groups; and/or
    CNT binding;
  wherein the thickener and polyethylene glycol based crosslinkable network form a structure comprising two interpenetrating networks; and
  wherein the polyethylene glycol based crosslinkable network comprises cross-linkable polyethylene glycol having an average molecular weight ranging from 660 Daltons to 35000 Daltons.

24. The bioink of claim 13, wherein the thickener comprises alginate with an average molecular weight of between 75 and 200 kDa.

25. The bioink of claim 13, wherein the thickener comprises alginate with an average molecular weight of above 200 kDa.

* * * * *